United States Patent [19]
Kanengieter et al.

[11] 3,748,840
[45] July 31, 1973

[54] AUTOMATIC HYDRAULIC SYSTEM FOR A HAY WAGON

[75] Inventors: Glenn G. Kanengieter, Blooming Prairie; Gerald F. Barry, Owatonna, both of Minn.

[73] Assignee: Owatonna Manufacturing Co. Inc., Owatonna, Minn.

[22] Filed: Oct. 12, 1972

[21] Appl. No.: 297,060

[52] U.S. Cl.................... 56/341, 56/11.9, 56/364
[51] Int. Cl................................................ A01d 89/00
[58] Field of Search.................... 56/341, 344, 345, 56/347, 350, 351, 364, 11.9

[56] References Cited
UNITED STATES PATENTS
3,534,537  10/1970  Buchele et al. ..................... 56/341
3,556,327  1/1971  Keith ................................ 56/341 X
3,691,741  9/1972  White et al. ...................... 56/350 X Primary Examiner—Louis G. Mancene
Assistant Examiner—J. N. Eskovitz
Attorney—Everett J. Schroeder, Joseph E. Ryan et al.

[57] ABSTRACT

An improved hay harvester, stacker and transporter employing a simplified hydraulic system in which the components thereof will be operated in a desired sequence through the operation of a single control handle or valve.

16 Claims, 3 Drawing Figures

3,748,840

AUTOMATIC HYDRAULIC SYSTEM FOR A HAY WAGON

Our invention relates to harvesting and stacking equipment and more particularly to an improved harvester or pickup, stacker and transporter apparatus particularly adapted for use with hay and designed to be controlled through a simplified automatic hydraulic control system.

Apparatus for harvesting or picking up crops, such as hay, straw or the like and blowing or transporting the same into a stack forming unit wherein such apparatus is to be drawn by a draft vehicle, such as a tractor, are known and in use. Similarly, such apparatus generally includes means for unloading the stack from the former together with retrieval of a stack and transporting the same. Prior apparatus of the type generally employ a plurality of motive devices for driving the components of the same, with the motive devices being adapted to be powered mechanically from the power take-off of the tractor and/or jointly with hydraulic supply from a tractor or draft vehicle. In the past, such equipment has required a plurality of control circuits each with an independent controller for operating the motor components thereof, and the complexity of such circuits to obtain a desired sequence of motor operation for the pick up, stacking, loading and unloading functions generally required a high degree of skill and attention of an operator and/or a plurality of operators for performing the harvesting or pick-up function together with the stacking and transporting functions. As a result the hydraulic or motive systems and mechanical systems for driving the same were generally complex in nature, requiring a great deal of time for connection and disconnection to the motive equipment which is normally independent thereof and necessitated a high cost and maintenance together with a high degree of skill or an increased number of operators for operating the same.

The present invention is directed to an improved apparatus of this type designed for the harvesting or pick up of crops having a blowing or transporting section for moving the same into a container, such as a stack former. The stack former is connected to the harvesting component and included a distribution hood which is operative to uniformly distribute the crops therein for uniform stack forming purposes. The apparatus includes a motive means for unloading and reloading stacks thus formed for transportation purposes. The present invention is directed to an improved system for operating the motive components of the harvester, stacker and transporter combination and in particular to an arrangement employing single hydraulic systems which a single control valve which will permit operation of the components thereof in a desired sequence through simple directional handle manipulation. The improved hydraulic system employs a pair of circuits with the motive portion of the components in series and parallel relationship therewith such that they may be operated through the operation of a single handle for each circuit in a forward or reverse direction to either side of a neutral position to effect a desired sequence of operation for initiation of harvesting or pick up or the cessation of the same for transport together with the operation of the components of the transport and unloading apparatus in a desired sequence of operation through the operation of a single control lever.

It is therefore the principal object of this invention to provide an improved harvester, stacker and transporter unit employing an improved hydraulic system.

Another object of this invention is to provide an improved apparatus of this type with a simplified control in the hydraulic system requiring only a single valve operation to provide a desired sequence of operation for the components thereof.

Another object of this invention is to provide in an apparatus of this type an improved hydraulic circuit which permits reversal of operation of the pick-up apparatus with movement of the same to the transport position to facilitate cleaning of the pick-up apparatus.

Another object of this invention is to provide in apparatus of this type a simplified hydraulic and mechanical circuits adapted to be energized from a tractor through the hydraulic system and power take-off thereof and through the use of a single hydraulic line in control for the harvesting pick-up apparatus.

Another object of this invention is to provide in apparatus of this type a simplified hydraulic circuit which permits full energization of the hydraulic motors in the harvesting operation and restricted energization of some of the components as the apparatus is reversed to a transport operation.

Another object of this invention is to provide an improved hydraulic circuit of this type for a harvesting apparatus in which the speed of operation of the distribution hood is selectively controlled.

A still further object of this invention is to provide an improved harvester and transporter apparatus which includes stack forming, loading and unloading components operated from a single hydraulic circuit through the control of a single control lever.

Another object of this invention is to provide in an apparatus of this type a single hydraulic control circuit for the loading and unloading portion of the apparatus which will provide a desired sequence of operation through the operation of a single control.

A still further object of this invention is to provide in an apparatus of this type simplified hydraulic circuits which are easy to connect, disconnect and maintain.

These and other objects of this invention will become apparent from a reading of the attached description together with the drawings wherein.

Figure 1:
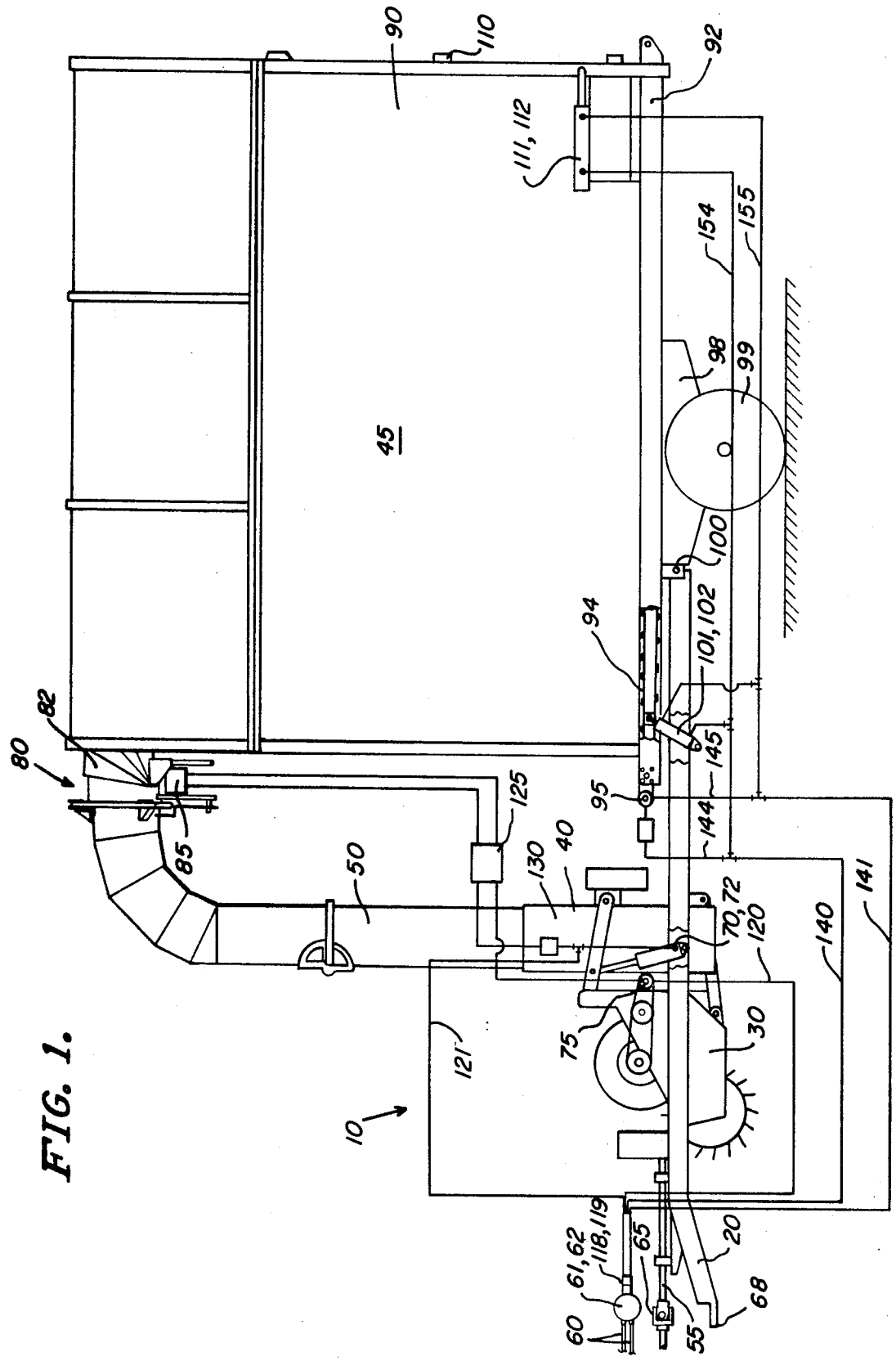
FIG. 1 is a schematic view of a hay wagon, harvester or pick-up apparatus together with stack forming equipment and loading and unloading components for the hay wagon and showing the motive components for operating the same.

Our invention in an apparatus for harvesting, stacking and loading crops such as hay is shown schematically in FIG. 1. The structure which includes a pick-up or harvester component, indicated generally at 10, and stack former and transporter components, indicated generally at 20, are coupled together as an integral unit to be towed by a suitable vehicle such as a tractor for the purpose of harvesting or picking up hay or grain which has been severed, directing the same through a blower or transporter into a conveying apparatus such as a stack former as will be hereinafter identified. The harvesting apparatus may include a suitable structure for severing grain type crops along with the pick-up mechanism and some type of conditioning or harvesting function with the transportation of either the harvested crop or a portion thereof into a suitable drawn container or former. Thus, as shown in FIG. 1, the harvester portion or pick-up portion includes a frame 20 which mounts a crop pick-up mechanism, indicated generally at 30, to convey the severed hay or grain through a series of pick-up fingers and/or augers (not shown) to a blower section, indicated generally at 40, with the blower section raising the hay or crop through a discharge pipe 50 to direct the same into the stack forming structure or draft wagon connected thereto and indicated generally at 45. The towing vehicle or tractor will supply a mechanical drive shaft in the form of a power take-off which would be coupled to a drive shaft 55 positioned on the frame and suitably journaled therein to be directed to and drive the impeller of the blower 40. The motive device or tractor will also provide a hydraulic supply in the form of a pair of hydraulic lines, indicated generally at 60, which would be directed through control valves which may or may not be included on the motive device or tractor, to be hereinafter identified, to single control circuits operating into the harvester, stack former and transporter portion of the apparatus. The power take-off will normally be coupled to the drive shaft 55 on the frame by means of a universal type coupler connection, indicated generally at 65, and the hydraulic supply 60 will be connected through control valves, indicated generally at 61 and 62, and normally mounted on the tractor in proximity with the operator for movement thereby. The frame includes a hitch 68 by means of which the frame will be connected to the tractor or draft vehicle. The pick-up portion 30 of the harvester or the ground contacting component thereof is pivotally mounted on the frame 20 to be raised between the ground contacting and elevated or transport position. Thus, as is indicated in FIG. 1, the pick-up portion of the harvester, indicated generally at 30, is pivotally mounted on the frame through pivot structures (not shown) to be moved between transport and ground contacting positions by means of a pair of actuators indicated at 70, 72. The pick-up mechanism is adapted to be rotated through a suitable pivot structure (not shown) and driven by an orbit motor indicated at 75 which orbit motor 75 along with the linear hydraulic actuators 70, 72 will be energized from the hydraulic supply through the single control valve 61. The discharge pipe 50 attached to the blower includes a distribution hood, indicated generally at 80, which hood is rotatable through a limited range of movement on the end of the discharge pipe and includes sections 82 which are pivoted to deflect flow through the pipe and into the stack former or wagon with simultaneous movement to the rotative movement of the entire distribution hood. A suitable orbit motor 85 also adapted to be connected to the hydraulic supply circuit controlled by the single control valve 61 will provide the rotative and pivotal movement of the parts of the distribution hood.

As will be best seen in FIG. 1, the discharge of the hay or crops through the distribution hood is directed into the wagon type conveyor 45 or former structure having an enclosure 90 which is mounted on a bed 92, the bed having transport chains 94 thereon driven through an orbit motor 95 connected thereto. The bed is supported on a chassis 98 having a suitable wheel support 99 connected thereto and with the front end of the chassis being pivotally connected to the frame 20 through a pivot structure 100. Suitable linear hydraulic actuators as indicated at 101 and 102 positioned on opposite sides of the bed and connected between the frame and the bed pivot the chassis on the frame 20 for the purpose of tilting the bed and hence, the enclosure thereon for the purpose of discharging a stack from within the enclosure. The enclosure 90 includes rear door structures, indicated at 110, with suitable actuators 111, 112 positioned on either side of the same for the purpose of opening the enclosing doors at the rear of the enclosure to facilitate discharge of the stack and complete the enclosure during formation of the stack. The orbit motor 95, the actuators 101, 102 and the actuators 111, 112 form parts of a second hydraulic circuit controlled by the single control valve 62 connected to the hydraulic supply 60 of the tractor which will permit the operator riding thereon to operate the transport mechanism in such a manner as to discharge or take on a load of hay or crop which has been either formed within the enclosure 90 or previously formed for the purpose of transporting and moving the same. The desired sequence of operation of the hydraulic components and the simplified hydraulic circuit for permitting operation of the structure by a single operator will be hereinafter explained.

Figure 2:
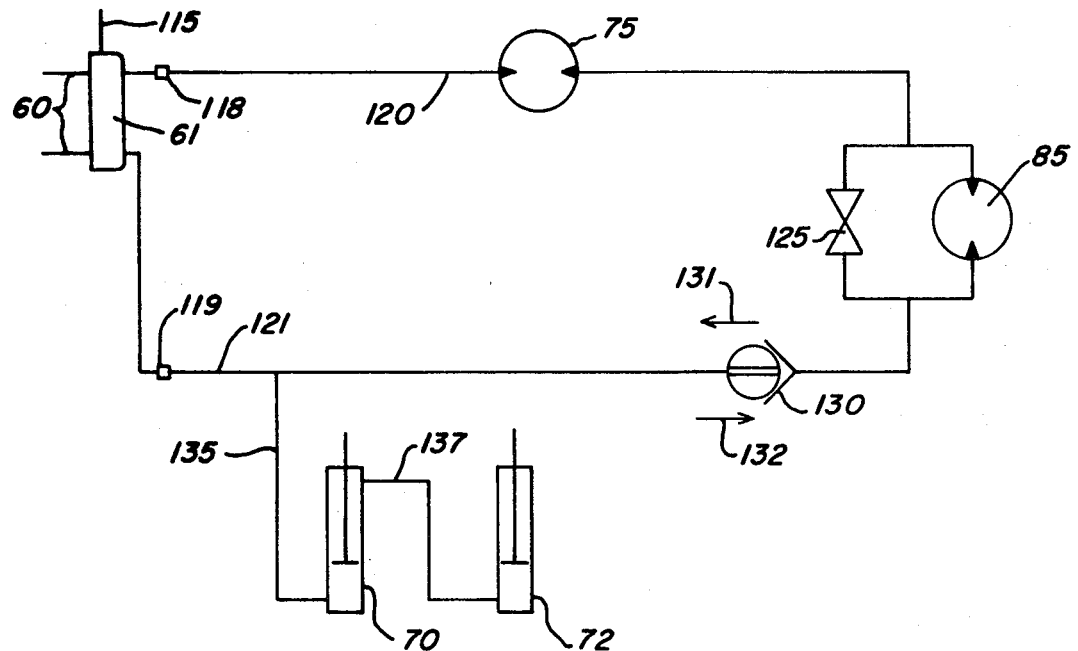
FIG. 2 is a schematic hydraulic circuit of the harvester or pick-up portion of the hay wagon system.

The improved harvester and transporter system which is shown basically in the drawings as a hay stacker and transporter is adapted to be controlled through simplified hydraulic circuits to properly sequence the components thereof. Thus in FIG. 2, there is shown schematically the hydraulic circuit for the components of the system adapted to pick up hay or the crop and form a stack therefrom. The hydraulic supply from the tractor as indicated by the piping 60 is directed through the single three way control valve 61 having a single operating handle 115 controlling the same. This is a three position valve having a center off position with directional positions to either side of the same for reversing the hydraulic flow from the supply 60 through the hydraulic circuit. As will be seen in FIG. 2, suitable coupler members 118, 119 permit disconnect of the system or hydraulic lines from the control valve 61 at the tractor when the same is not in usage or the apparatus is not associated with the tractor. The hydraulic circuit includes a pair of flexible hose piping indicated at 120, 121 which are coupled together at the components to provide a continuous flow of circuit under conditions to be hereinafter defined. The hose piping 120 leads to the orbit motor 75 in a series type hydraulic circuit which motor drives the pick-up device or rotates the same. The flow circuit continues through the orbit motor 85 of the distribution hood assembly with the orbit motor 85 having a parallel connected adjustable valve 125 connected around the same so that the flow through the orbit motor 85 may be proportioned to vary the speed of operation of the orbit motor 85 and hence, the distribution hood. The hydraulic circuit has in a series circuit relationship therewith a directional check valve assembly 130 which provides an unrestricted flow through the circuit in the direction of the arrows 131 and restricted flow through the circuit in the direction of the arrow 132. The circuit is completed by the piping 121 common thereto with a flow pipe 135 being connected to one side of the hydraulic actuator or ram 70 of the pair of actuators elevating or raising and lowering the pick-up mechanism. The opposite side of the actuator 70 is connected through a conduit or pipe 137 to the lower or common side of the actuator 72 corresponding to the side of the actuator 70 to which the hydraulic power or circuit is applied. The opposite side of the actuator 72 is united to atmosphere and the connections between the actuators 70, 72 provide a master slave relationship with the operation of the actuator 72 following the actuator 70 in the same direction and to the same degree of movement for the purpose of elevating or lowering the pick-up mechanism 30. The latter is pivoted on the frame 20 and with flow in the hydraulic circuit in the direction of the arrow indicated at 131, the conduit 121 becomes the return conduit with the conduit 120 becoming the supply conduit and a reduction in pressure exists on the lower side of the actuator 70 allowing the same and the actuator 72 to move in a direction to lower the pick-up mechanism. Unrestricted flow takes place simultaneously in the orbit motor 75 of the pick-up mechanism and in the orbit motor 85 of the distribution head. Thus, the circuit is such that a single operator may be moving the control lever 115 operate the components of the pick-up and stack forming portion of the apparatus to an operative pick-up position or to a transport position by merely moving the control handle from one side of the reference or off position to the other reversing the flow through the single continuous hydraulic flow of circuit. Thus, as the operator moves the control handle of the valve 61 in a direction to cause flow in the direction of arrow 131, the pick-up device 30 starts running and the hood motor starts running and the pick-up device lowers down to an operating position. This is the proper sequence of operation since the pick-up device performs only in the lower position and this is the only time that the hood motor is required to run. When the operator desires to raise the pick-up device to the transport position or upon completion of the stack forming operation, the lever is moved in the opposite direction providing a reversal of flow through the continuous hydraulic circuit or the application of pressure to the conduit 121 and the connection of the conduit 120 to the return or reservoir side of the hydraulic supply. This provides maximum pressure on the actuator 70 elevating the same and causing the slave actuator 72 to follow the movement raising the pick-up mechanism. Flow in the direction of the arrow 132 is restricted because of the restricted check valve 130 and consequently, the orbit motors 85 and 75 will move slowly in a reversed direction of operation. Thus, if the pick-up device or the blower 40 which is powered by the take-off through the drive shaft 55 should plug, the operator merely raises the pick-up mechanism 30 by reversing the flow with operation of the control valve 61 causing the hydraulic pick-up motor to reverse and therefore back out the plugged material. This eliminates the problem of an operator getting off the tractor and pulling material out by hand. The simplified circuit provides for automatic reversal of the pick-up motor as the pick-up device is raised up and out of windrowed materials. The speed of operation of the hood motor is controlled by the adjustable valve 125 which is connected in parallel with the hood motor. This arrangement does not affect the operation of the pick-up device of any of the other components in the hydraulic system. The reversed flow through the pick-up device provides for a self-cleaning operation of the apparatus at any time during transport or cessation of operation.

It will be undestood that the raising of the pick-up head whether it be a pick-up device, auger device or some type of hay condition or harvester will be accompanied simultaneously be reversal of flow through the drive motor for the same permitting a self-cleaning operation.

Figure 3:
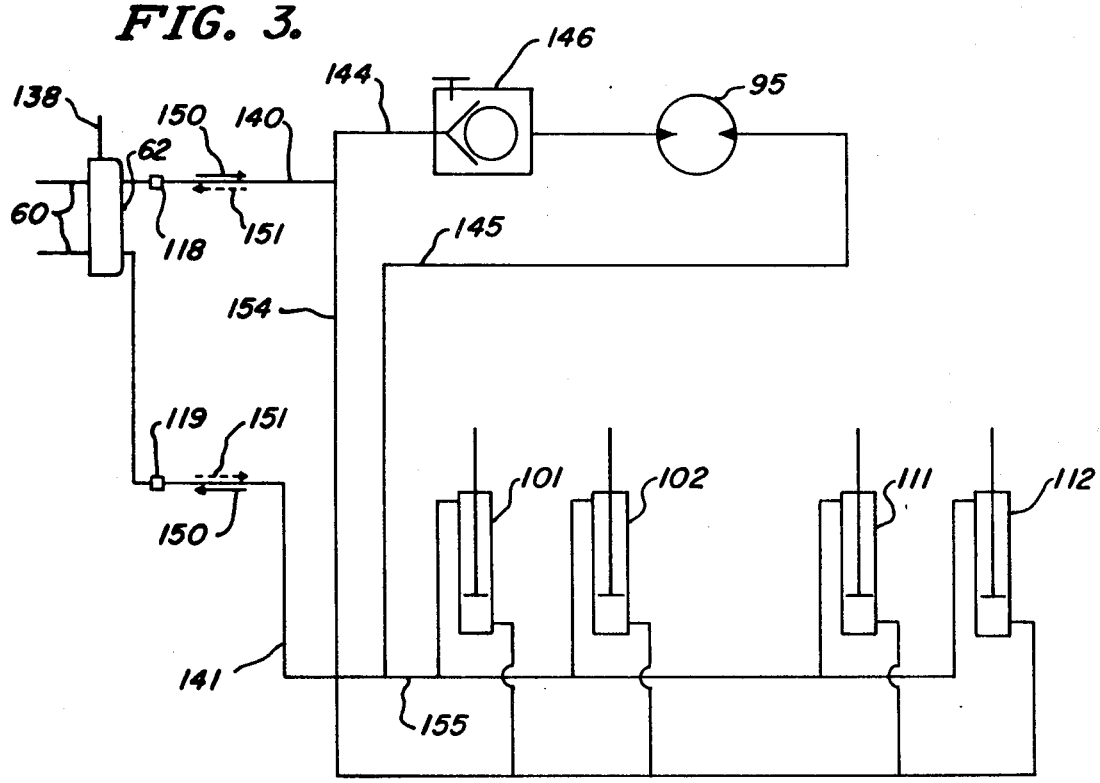
FIG. 3 is a schematic hydraulic circuit of the loader and unloader portion of the hay wagon system.

In FIG. 3, the simplified hydraulic control circuit for the transporter unloader portion of the apparatus is disclosed. It similarly connects to the hydraulic supply 60 and through a simplified control valve 62 having a control handle 138 operating the same. This is a three position valve having a center off position designed to reverse the flow from the hydraulic supply through the disconnect couplers 118, 119 to the piping or conduit 140, 141 defining the continuous flow passage to the components of the same or the motors 95, 101, 102 and 111, 112. This simplified control circuit as shown in the drawings, provides for a single flow circuit through the motor 95 from the conduits 140, 141 as indicated by the conduits 144, 145 with the directional check valve 146 in series therewith. In parallel with this circuit as indicated by the conductors or pipes 154 and 155 common to pipe 141 are actuators 101, 102, 111 and 112 which are connected across or in parallel therewith and across the flow line so that common sides of the actuators 101, 102, 111 and 112 are connected to the flow pipe 154 with the opposite ends of the actuators 101, 102, 111 and 112 being connected to the flow pipe 155, 141 in parallel relationship. This portion of the harvester control operates to control the loading and unloading of a stack formed through uniform distribution of the crop material or hay within the enclosure 90 and carried on the trailer mechanism which supports the frame 20 and to which the trailer mechanism is pivotally connected. In the unloading of a stack of material which has been uniformly distributed within the enclosure to form the stack, the orbit motor 95 of the unloading chains on the platform 92 will become operative to drive or move the stack out of the enclosure. Simultaneous with this operation, the tilt rams or motors 101, 102 will pivot the trailer mechanism and hence the bed so that one end is in engagement with the ground to permit deposit of the stack directly to the ground as the entire structure is advanced by the tractor and the chains 194 driven by the orbit motor move the stack from within the enclosure. Prior to movement of the stack, the doors 110 completing the enclosure at the rearward end of the same will be opened through operation of the actuators 111, 112. The movement of the single hydraulic valve 62 through operation of its control lever 138 will provide for these three functions and the operator does not have to think as to which function to perform first. Since all of the actuators are controlled by the single control valve the cost of the system is considerably reduced. Oil flow from the reversing valve 62 will be directed in the direction of the arrows indicated at 150 for the unloading operation and in the direction of the arrows indicated in phantom at 151 in the loading operation. Thus, flow from the hydraulic source 60 in the direction of the arrow 150 will apply hydraulic pressures to the lower portions of the cylinders 101, 102, 111 and 112 as shown in the drawings of FIG. 3. Since the back doors of the least resistance, these actuators will open initially opening the enclosure for the unloading operation. The tilting operation of the platform or bed will then take place through operation of the actuators 101, 102. Flow through the parallel portion of the hydraulic circuit will take place simultaneous to the piping 144, 145 and the check valve 146 in an unrestricted direction to energize the orbit motor 95 controlling the drive chains for the unloader on the platform. These can operate simultaneously with the actuators 101, 102 since it makes no difference whether one or the other operates initially. For example, if the stack is front heavy, the belt chains will move the stack backwards slightly until the load is over center at which point the bed will tilt. Otherwise, the operation of the actuators may take place simultaneously.

Oil flow in the reverse direction or in the direction of the arrows indicated at 151 returns the unit to the transporting and operating position for stack forming purposes. The check valve 146 will be closed with reverse flow and therefore oil is forced into the tilt and door hydraulic cylinders 101, 102 and 111, 112. These cause the rams to close up the rear doors and the bed to come to a normal position or level position after a stack has been discharged.

Whenever the transport or trailer mechanism is to be used for picking up a previously formed stack from a ground position, the direction of flow through the orbit motor 95 driving the chains is permitted for reverse operation by opening of the adjustable check valve 146 permitting free flow in this direction. This operation will normally take place when the enclosure is removed from the bed so that the door closer actuators 111, 112 are removed or disconnected from the circuit. At this time, loading of the actuators 101, 102 will prevent tilting of the bed until the stack has been moved onto the same and to a point where it reaches an over center position on the actuators 101, 102 will be able to actuate to pivot the platform to a horizontal position. Under normal conditions for transport, the check valve 146 is closed in this direction so that the orbit motor 95 does not receive hydraulic fluid to reverse direction of operation.

The improved hydraulic control system for the stack forming and transporting apparatus provides for simplified hydraulic circuits each controlled by a single control valve with directional control to the hydraulic circuit for operating the components in circuit therewith in a desired sequence of operation. This enables the operator to switch from one mode of operation to the other through the operation of a single control handle and obtain the desired sequence of operation. It eliminates additional controls and separate handles requiring greater operator attention and permits the single operator to operate a tractor mechanism and the control mechanisms for the stacker and loader from his position on the tractor. The simplified system similarly reduces the cost of the system and the maintenance thereof. This simplified control may be employed in connection with harvesting mechanisms and the components thereof may take different forms.

Therefore in considering this invention it should be remembered that the disclosure is illustrative only and the scope of the invention should be determined by the appended claims.

What is claimed is:

1. A hay harvester and stacker comprising, a frame adapted to be connected to and drawn by a tractor having a hydraulic supply and a power take-off thereon, a pivotally mounted crop pick-up device carried by said frame and pivoted thereon between a ground engaging and an elevated transport position, a linear hydraulic motor means mounted on the frame and connected to the pick-up device for pivoting the pick-up device on the frame between ground elevating and crop engaging position, orbit motor means connected to the crop pick-up device for rotating the pick-up device to pick up crops thereby, a blower including a blower pipe mounted on the frame and associated with the crop pick-up device to receive crops picked up therefrom and to blow the crops through the blower pipe, said blower being adapted to be connected to and powered by the power take-off of the tractor, an enclosed wagon type stack former having a frame with the wheel support mounting the same with the frame being pivotally connected to the first frame and supporting the end of the same remote from the tractor and with the blower pipe positioned adjacent the top of the enclosed stack former, a distribution hood assembly mounted on the end of the blower pipe including an orbit motor thereon adapted to pivot and rotate the hood simultaneously to distribute crops from the blower pipe uniformly within the enclosure of the stack former, and a hydraulic circuit means including a pair of hydraulic lines defining a continuous flow circuit with a single reversing valve and control lever operating the same positioned in the flow lines and connected to the hydraulic supply, said hydraulic circuit being connected to the orbit motors of the pick-up device and the distribution hood in a series circuit and to one side of the actuator raising and lowering the pick-up device.

2. The hay harvester and stack of claim 1 in which the motors of the pick-up device and the distribution head reverse with reversal of the control lever of the reversing valve.

3. The hay harvester and stacker of claim 1 in which the single reversing valve with the control handle for the hydraulic circuit in one position will sequence the pick-up device to lower to a working position with subsequent operation of the orbit motors for the pick-up device and distribution hood.

4. The hay harvester and stacker of claim 3 and including an adjustable valve in the hydraulic circuit connected in parallel with the orbit motor for the distribution head to vary the speed of the same.

5. The hay harvester and stacker of claim 4 and including a restrictive check valve positioned in the hydraulic circuit in series relationship with the orbit motors of the distribution head and pick-up device and permitting slow speed reversed operation of the orbit motor for the pick-up device with raising of the pick-up device for cleaning the same.

6. The hay harvester and stacker of claim 1 in which the linear hydraulic motor means are a pair of linear hydraulic actuators one of which is connected in slave relationship with the other and with the other connected at one extremity to the hydraulic circuit means.

7. The hay harvester and stacker of claim 1 in which the single reversing valve is a three position valve having a center off position with reversed flows through the continuous flow circuit in opposite directions for the positions to either side of the off position.

8. The hay harvester and stacker of claim 7 in which the hydraulic circuit includes a restrictive check valve in series circuit with the orbital motors of the pick-up device and distribution head and in which the linear hydraulic motor means is positioned in parallel circuit therewith such that with one position on the handle flow will be directed through the orbital motors and restrictive check valve unrestricted to the linear hydraulic motor means in the return line of the hydraulic circuit to provide a sequence of operation in which the linear hydraulic motor means is operative in one direction to lower the pick-up device with subsequent operation of the orbital motors at a full rate of operation, and in which the control valve will be operative in another position to direct flow to the linear hydraulic motors of the pick-up device to raise the same with restricted flow through the chedk valve to reverse the flow through the orbital motors and effect the slow rate of reverse rotation and cleaning of the pick-up device with the device raised in an elevated position.

9. The hay harvester and stacker of claim 1 in which the enclosed wagon type stack former includes chain drive means positioned over the frame for removing the stacked crop therein and power operated doors including motor means for operating the same positioned on one end of the enclosure for opening the enclosure to remove the stack therefrom, and including further motive means for pivoting the frame of the stack former on the wheel support relative to the first frame.

10. The hay harvester and stacker of claim 9 and including an additional hydraulic circuit means including a reversing valve adapted to connect the additional circuit means to the hydraulic supply and connecting the motors of the doors and frame together with the motor of the chain type drive in a parallel flow circuit with the hydraulic supply and second control valve.

11. The hay harvester and stacker of claim 10 in which the pivot motors for the frame and the door on the stack former are linear hydraulic actuators connected in parallel in the second hydraulic circuit and in which the motor for the chains in an orbit motor connected in series with the hydraulic control valve and including a check valve means in series with the orbit motor.

12. The hay harvester and stacker of claim 11 in which the check valve includes a manual override for permitting selective reversible rotation of the orbit motor driving the chains for the stack former.

13. A hay harvester and stacker comprising, a wheeled frame member having an enclosed box thereon adapted to be connected to and drawn by a tractor having a hydraulic supply and a power take-off thereon, a pivotally mounted crop pick-up device carried by said frame and pivoted thereon between a ground engaging and an elevated transport position, a linear hydraulic motor means mounted on the frame and connected to the pick-up device for pivoting the pick-up device on the frame between ground elevating and crop engaging position, orbit motor means connected to the crop pick-up device for rotating the pick-up device to pick up crops thereby, a blower including a blower discharge pipe mounted on the frame and associated with the crop pick-up device to receive crops picked up therefrom and to blow the crops through the blower pipe, said blower being adapted to be connected to and powered by the power take-off of the tractor, a distribution hood assembly mounted on the end of the discharge pipe including an orbit motor thereon adapted to pivot and rotate the hood simultaneously to distribute crops from the discharge pipe uniformly within the enclosed box, and a hydraulic circuit means including a pair of hydraulic lines defining a continuous flow circuit with a single reversing valve and control lever operating the same positioned in the flow lines and connected to the hydraulic supply, said hydraulic circuit being connected to the orbit motors of the pick-up device and the distribution hood in a series circuit and to one side of the actuator raising and lowering the pick-up device.

14. A hay harvester and stacker comprising, a wheeled frame member having an enclosed box thereon adapted to be directed to and drawn by a tractor having a hydraulic supply in a power take-off thereon, a pivotally mounted crop harvester mechanism carried by said frame and pivoted thereon between a ground engaging and an elevated transport position, a linear hydraulic motor means mounted on the frame and connected to the harvester mechanism for pivoting the harvester mechanism on the frame between ground elevating and crop engaging position, orbit motor means connected to the crop harvester mechanism for operating the crop harvester mechanism, a blower including a blower discharge pipe mounted on the frame and associated with the crop harvester mechanism to receive crops picked up therefrom and to blow the crops through the blower pipe, said blower being adapted to be connected to and powered by the power take-off of the tractor, a distribution hood assembly mounted on the end of the discharge pipe including an orbit motor thereon adapted to pivot and rotate the hood simultaneously to distribute crops from the discharge pipe uniformly within the enclosure, and a hydraulic circuit means including a pair of hydraulic lines defining a continuous flow circuit with a single reversing valve and control lever operating the same positioned in the flow lines and connected to the hydraulic supply, said hydraulic circuit being connected to the orbit motors of the harvester mechanism and the distribution hood in a series circuit and to one side of the actuator raising and lowering the harvester mechanism.

15. The hay harvester and stacker of claim 14 in which the orbit motors of the harvester mechanism and distribution hood reverse in direction of rotation with raising of the harvester mechanism.

16. The hay harvester and stacker of claim 15 in which the hydraulic circuit means includes a check valve restricting flow of operation to the orbit motors with reversal of the control lever to provide for full speed operation of the linear hydraulic motor raising the harvester mechanism and reduced reversed speed of rotation of the orbit motors.

* * * * *

UNITED STATES PATENT OFFICE
CERTIFICATE OF CORRECTION

Patent No. 3,748,840  Dated July 31, 1973

Inventor(s) Glenn G. Kanengieter

It is certified that error appears in the above-identified patent and that said Letters Patent are hereby corrected as shown below:

Claim 14, Column 10, line 3, delete the word "directed" and insert the following -- connected --

Claim 14, Column 10, Line 4, delete "in" and insert the following -- and --

Signed and sealed this 1st day of January 1974.

(SEAL)
Attest:

EDWARD M. FLETCHER, JR.
Attesting Officer

RENE D. TEGTMEYER
Acting Commissioner of Patents